(12) United States Patent
Bando

(10) Patent No.: US 7,017,810 B2
(45) Date of Patent: Mar. 28, 2006

(54) IC CARD AND IC CARD SYSTEM

(75) Inventor: Hideaki Bando, Tokyo (JP)

(73) Assignee: Sony Corporation, (JP)

( * ) Notice: Subject to any disclaimer, the term of this patent is extended or adjusted under 35 U.S.C. 154(b) by 6 days.

(21) Appl. No.: 10/182,953

(22) PCT Filed: Dec. 13, 2001

(86) PCT No.: PCT/JP01/10926

§ 371 (c)(1),
(2), (4) Date: Jul. 16, 2003

(87) PCT Pub. No.: WO02/48849

PCT Pub. Date: Jun. 20, 2002

(65) Prior Publication Data

US 2004/0027870 A1    Feb. 12, 2004

(30) Foreign Application Priority Data

Dec. 14, 2000  (JP) .............................. 2000-379590

(51) Int. Cl.
*G06K 7/06*       (2006.01)
(52) U.S. Cl. ...................... 235/441; 235/492; 713/400; 375/354
(58) Field of Classification Search ................ 235/492, 235/441; 713/503
See application file for complete search history.

(56) References Cited

U.S. PATENT DOCUMENTS

| 5,070,234 A | * | 12/1991 | Ishii et al. .................. 235/441 |
| 5,692,166 A | | 11/1997 | Milhizer et al. |
| 5,712,881 A | * | 1/1998 | Iijima ......................... 375/354 |
| 5,828,871 A | | 10/1998 | Kawaguchi et al. |
| 5,864,695 A | * | 1/1999 | Yanagihara ................. 713/500 |

FOREIGN PATENT DOCUMENTS

| EP | 0 525 221 A1 | | 2/1993 |
| JP | 61-148937 A1 | | 7/1986 |
| JP | 10-187275 A1 | | 7/1998 |
| JP | 11-514765 A1 | | 12/1999 |
| JP | 2000-268139 A | * | 9/2000 |
| JP | 2001-265716 A1 | | 9/2001 |

* cited by examiner

*Primary Examiner*—Jared J. Fureman
(74) *Attorney, Agent, or Firm*—Lerner, David, Littenberg, Krumholz & Mentlik, LLP

(57) ABSTRACT

An interface is connectable between a main unit and an IC card and includes a data transmission path and a clock signal transmission path. The IC card receives a clock signal transmitted from the main unit over the clock signal transmission path and returns the clock signal to the main unit over the clock signal transmission path. A data transmission unit of the IC card receives the clock signal and outputs data over the data transmission path for delivery to the main unit. A data receiving unit of the main unit receives the returned clock signal and receives the data transmitted by the data transmission unit.

9 Claims, 14 Drawing Sheets

US 7,017,810 B2

IC CARD AND IC CARD SYSTEM

TECHNICAL FIELD

The present invention relates to an IC card and an IC card system that has for example a flash memory and that is removable from a main unit of a data processing apparatus.

BACKGROUND ART

FIG. 1 is a block diagram showing a data communicating method performed between a main unit of a conventional apparatus (hereinafter referred to as main unit 1) and an IC card 2. To perform a data communication between the main unit 1 and the IC card 2, a clock signal and a data signal that is input and output in synchronization therewith are used. While the data signal is bi-directionally communicated between the main unit 1 and the IC card 2, the clock signal is one-directionally communicated from the main unit 1 to the IC card 2.

FIG. 2 is a block diagram showing a detailed structure of the system shown in FIG. 1. In FIG. 2, reference characters FF1R, FF1S, FF2R, and FF2S represent flip-flops. Each of the flip-flops FF1R, FF1S, FF2R, and FF2S has a data input D and a data output Q. Reference characters 101R, 102R, and CLK1 represent input buffers. Reference characters 101S, 102S, and CLK0 represent output buffers. Reference characters 101S, 102S, 101R, and 102R are composed of tri-state buffers. The main unit 1 has a clock generator 3 that generates a clock signal. Reference characters 1DE and 2DE represent control signals. Reference characters DATA and CLK represent a data transmission path and a clock transmission path disposed between the main unit 1 and the IC card 2, respectively.

First of all, the case that a data communication is performed from the main unit 1 to the IC card 2 will be described. The control signal 1DE causes the tri-state buffer 101S to be set to an output enable state. The control signal 2DE causes the tri-state buffer 102S to be set to an output high impedance state. Thus, data is transmitted from the flip-flop FF1S to the flip-flop FF2R. The clock signal is generated by the clock generator 3 of the main unit 1. The clock signal is input to the clock input of the flip-flop FF2R through a path of (output buffer CLK0->transmission path CLK->input buffer CLK1).

The data signal is output from the flip-flop FF1S in synchronization with a leading edge of the clock signal that is input from the clock generator 3 to the clock input of the flip-flop FF1S. The data signal is input to the data input of the flip-flop FF2R through a path of (output buffer 101S->transmission path DATA->input buffer 102R). The data signal is captured in synchronization with a leading edge of the clock input of the flip-flop FF2R.

Next, the case that a data communication is performed from the IC card 2 to the main unit 1 will be described. The control signal 1DE causes the tri-state buffer. 101S to be set to an output high impedance state. The control signal 2DE causes the tri-state buffer 102S to be set to an output enable state. Thus, a data transmission is performed from the flip-flop FF2S to the flip-flop FF1R. The clock signal is generated by the clock generator 3 of the main unit 1. The clock signal is input to the clock input of the flip-flop FF1R.

The data signal is output from the flip-flop FF2S in synchronization with a leading edge of the clock signal that is input to the clock input of the flip-flop FF2S through a path of (clock generator 3->output buffer CLK0->transmission path CLK->input buffer CLK1). The data signal is input to the data input of the flip-flop FF1R through a path of (output buffer 102S->transmission path DATA->input buffer 101R). The data signal is captured in synchronization with a leading edge of the clock input of the flip-flop FF1R.

FIG. 3 is a schematic diagram showing the structure of a system that performs a data communication from the IC card 2 to the main unit 1. FIG. 4 is a timing chart showing the data communication performed by the system shown in FIG. 3. Next, the system and timing chart of the data communication performed thereby shown in FIGS. 3 and 4 will be described.

As shown in FIG. 3, when the data communication is performed from the IC card 2 to the main unit 1, the data signal is transmitted from the flip-flop FF2S to the flip-flop FF1R. The clock signal that is input to the flip-flop FF2S has a delay that is the sum of a delay due to the output buffer CLK0, a delay due to the transmission path CLK, and a delay due to the input buffer CLK1 against the clock signal that is input to the flip-flop FF1R. The sum of the delays is denoted by clock delay TD1.

A delay after a leading edge of the clock input of the flip-flop FF2S until the arrival of the clock signal to the data input of the flip-flop FF1R is the sum of a delay due to the flip-flop FF2S, a delay due to the output buffer 102S, a delay due to the transmission path DATA, and a delay of the input buffer 101R. The delay due to the flip-flop FF2S is denoted by data delay TD3. The sum of the delay due to the tri-state buffer 102S, the delay due to the transmission path DATA, and the delay due to the input buffer 101R is denoted by data delay TD2.

The data that is output in synchronization with the clock input of the flip-flop FF2S should arrive at the data input of the flip-flop FF1R by the next leading edge of the clock input of the flip-flop FF1R. However, since there are clock delay TD1 and data delays TD2 and TD3, the timing tolerance becomes insufficient as shown in FIG. 4. As a result, although it is necessary to shorten the clock period for a higher data communication, a clock period equal to or lower than (delay TD1+delay TD2+delay TD3) cannot be accomplished.

Therefor, an object of the present invention is to provide an IC card and an IC card system that have a structure that allows the difference between the delay time of the clock signal and the delay time of the data signal to become zero so that a communication for data that is output from the IC card can be performed at higher speed than before and a larger amount of data can be transmitted in a shorter time than before.

DISCLOSURE OF THE INVENTION

In accordance with the invention, an IC card is removable from a main unit of an apparatus, the IC card having a data terminal and a clock terminal, a clock signal being capable of being received from the main unit through the clock terminal, the clock signal being capable of being transmitted from the clock terminal to the main unit.

Also in accordance with the invention, an IC card system is composed of a main unit of an apparatus and a removable IC card, the IC card system comprising:

interface means including a data transmission path and a clock transmission path, wherein the interface means is configured:

to transmit a first clock signal from the main unit to the IC card through the clock transmission path and transmit data from the main unit to the IC card in synchronization with the first clock signal through the data transmission path and, to transmit a second clock signal from the IC card to the main unit through the clock transmission path and transmit data from the IC card to the main unit through the data transmission path in synchronization with the second clock signal.

According to the present invention, when data is transmitted from the IC card to the main unit, the clock signal is bi-directionally communicated. Both the data signal and the clock signal are transmitted from the IC card to the main unit. In addition, the difference between the delay time of the data signal and the delay time of the clock signal becomes zero. As a result, the clock period can be more shortened and the communication can be performed at higher speed than before.

BEST MODES FOR CARRYING OUT THE INVENTION

Next, with reference to the accompanying drawings, embodiments of the present invention will be described. First of all, an example of an IC card (memory apparatus) according to the present invention will be described.

Figure 1:
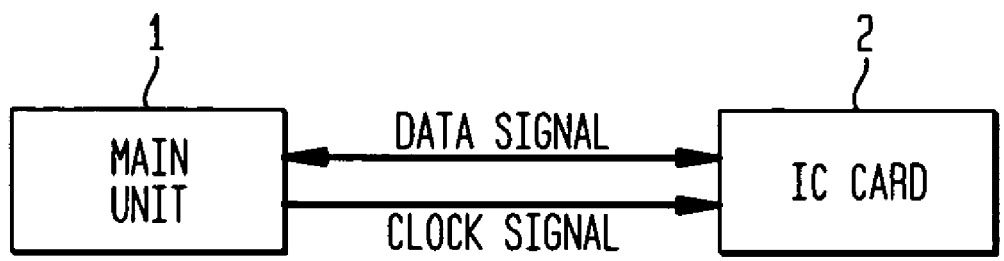
FIG. 1 is a block diagram showing a data communicating method performed between a conventional main unit and an IC card.
Figure 2:
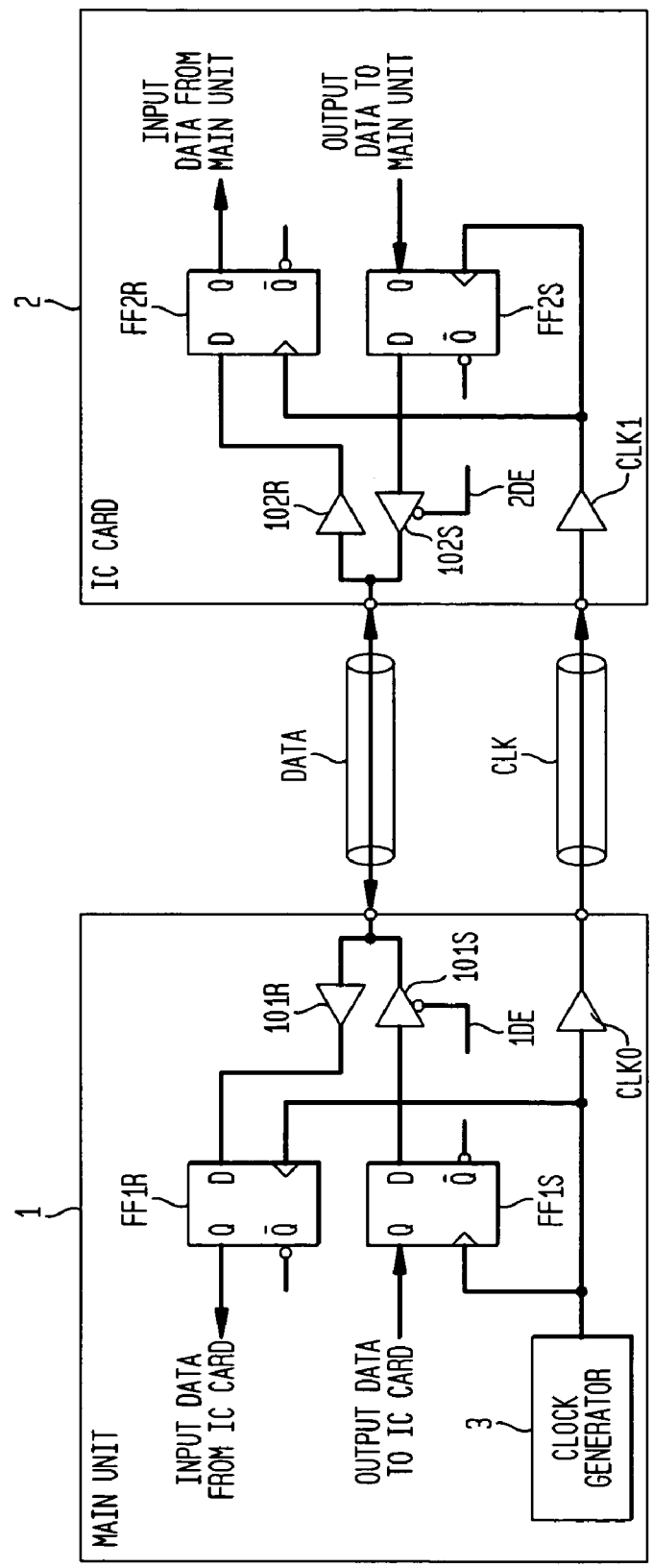
FIG. 2 is a schematic diagram showing the detailed structure of a system that performs the data communicating method shown in FIG. 1.
Figure 3:
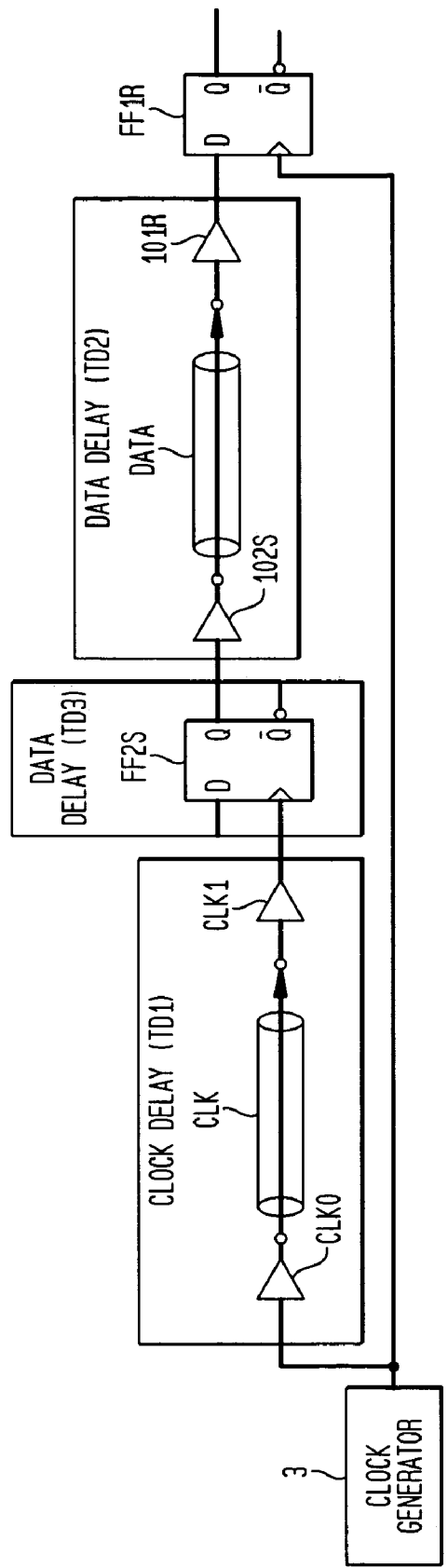
FIG. 3 is a schematic diagram showing the structure of a system that performs a data communication from an IC card to a main unit.
Figure 4:
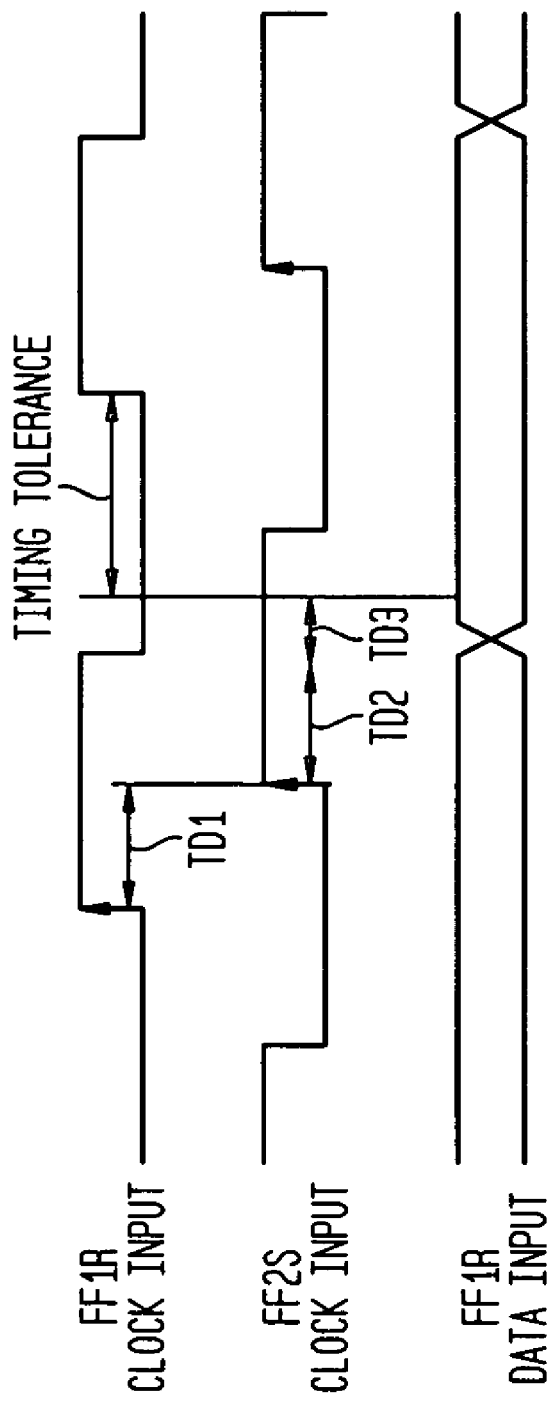
FIG. 4 is a timing chart for explaining the data communication performed by the system shown in FIG. 3.
Figure 5:
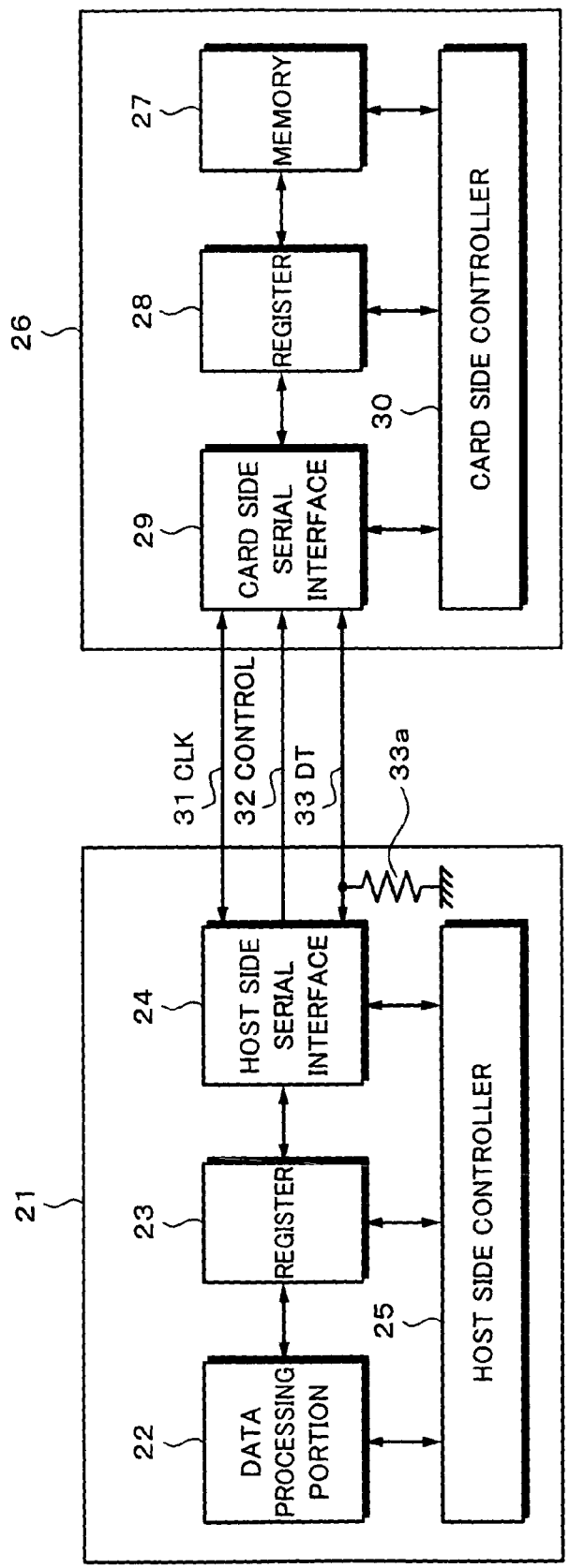
FIG. 5 is a block diagram showing an example of an IC card system according to the present invention.

FIG. 5 shows the structure of a system composed of a main unit 21 and an IC card 26. The main unit 21 has a data processing portion 22, a register 23, a host side serial interface circuit 24, and a host side controller 25. The IC card 26 is a storage medium having a card shaped appearance. The IC card 26 is used as an external storing unit connected to the main unit 21. The IC card 26 has a memory 27, a register 28, a card side serial interface circuit 29, and a card side controller 30.

The data processing portion 22 of the main unit 21 reads data from the IC card 26 and performs various processes therefor and generates data to be written to the IC card 26. In other words, the data processing portion 22 is a data processing circuit used in a computer apparatus that uses the IC card 26, used in a recording and reproducing apparatus for a digital audio signal, or used in an audio visual apparatus such as a camera apparatus.

The register 23 is a buffer for the data processing portion 22 and the host side serial interface circuit 24. In other words, when the main unit 21 supplies data from the data processing portion 22 to the host side serial interface circuit 24, the main unit 21 temporarily stores the data to the register 23 and then supplies the data to the host side serial interface circuit 24. Likewise, when the main unit 21 supplies data from the host side serial interface circuit 24 to the data processing portion 22, the main unit 21 temporarily stores the data to the register 23 and then supplies the data to the data processing portion 22.

The host side serial interface circuit 24 converts data supplied from the data processing portion 22 through the register 23 and a command supplied from the host side controller 25 into a serial signal and supplies the serial signal to the IC card 26. In addition, the host side serial interface circuit 24 converts the data and command of the serial signal supplied from the IC card 26 into parallel signals and supplies the parallel signals to the data processing portion 22 and the host side controller 25.

In addition, the host side serial interface circuit 24 supplies a synchronous signal (CLK) and so forth for various types of data and commands to the IC card 26. In addition, the host side serial interface circuit 24 obtains from the IC card 26 a status signal that represents the operating state thereof.

The host side controller 25 controls a data processing operation of the data processing portion 22 and a transmitting operation of the host side serial interface circuit 24 for various types of data. In addition, the host side controller 25 supplies to the IC card 26 a command as a control instruction therefor through the register 28.

On the other hand, the memory 27 of the IC card 26 is composed of for example a flash memory. The memory 27 stores data supplied from the data processing portion 22.

The register 28 is a buffer for the memory 27 and the card side serial interface circuit 29. In other words, when data supplied from the main unit 21 is written to the memory 27, the register 23 temporarily stores the data and then supplies the data to the memory 27. Likewise, when the main unit 21 reads data from the memory 27, the main unit 21 temporarily stores the data to the register 23 and then supplies the data to the card side serial interface circuit 29. In other words, the register 28 is a circuit that performs a so-called page buffer function or the like of the flash memory.

The card side serial interface circuit 29 converts data of a parallel signal supplied from the memory 27 and a command supplied from the card side controller 30 into a serial signal under the control of the card side controller 30 and supplies the serial signal to the main unit 21. In addition, the card side serial interface circuit 29 converts data and a command of the serial signal supplied from the main unit 21 into parallel signals and supplies the parallel signals to the memory 27 and the card side controller 30.

In addition, the card side serial interface circuit 29 supplies a synchronous signal (CLK) and so forth for various types of data and a command to the main unit 21. In addition, the card side serial interface circuit 29 supplies a status signal to the main unit 21.

The card side controller 30 controls a data storing operation, a data reading operation, a data erasing operation, and so forth of the memory 27 corresponding to commands and so forth supplied from the main unit 21. In addition, the card side controller 30 controls a transmitting operation of the card side serial interface circuit 29 for various types of data. The host side controller 25 controls the supply for the status signal to the IC card 26.

The data transmission between the main unit 21 and the IC card 26 is performed through transmission lines disposed between the host side serial interface circuit 24 and the card side serial interface circuit 29.

Three signal lines that are a CLK line 31, a control line 32, and a DT line 33 are disposed between the host side serial interface circuit 24 of the main unit 21 and the card side serial interface circuit 29 of the IC card 26.

Main data that is data processed by the data processing portion 22 and written to the memory 27 and data that is read from the memory 27 to the data processing portion 22 is transmitted through the DT line 33. In addition, a command as a control instruction supplied from the main unit 21 to the IC card 26 and a command supplied from the IC card 26 to the main unit 21 are transmitted through the DT line 33. In other words, the main data and command as a serial signal are bi-directionally transmitted through the DT line 33.

A resistor 33a is connected to the DT line 33. One end of the resistor 33a is grounded. The resistor 33a is a so-called pull down resistor. While a signal is not being transmitted and received between the host side serial interface circuit 24 and the card side serial interface circuit 29 through the DT line 33, the signal level of the DT line 33 is low. In other words, while a signal is not being transmitted and received through the DT line 33, the signal level of the DT line 33 is constant that depends on the resistance and so forth of the resistor 33a.

In this example, for the resistor 33a, a so-called pull down resistor is used. While a signal is not being transmitted and received through the DT line 33, the signal level of the DT line 33 is low. It should be noted that for the resistor 33a, a so-called pull up resistor can be used. In this case, while a signal is being not transmitted and received through the DT line 33, the signal level of the DT line 33 is high. A clock signal is bi-directionally transmitted between the main unit 21 and the IC card 26 through the CLK line 31.

A control signal is supplied from the main unit 21 to the IC card 26 through the control line 32. While the control signal is being supplied (for example, while the signal level of the control signal is high), the main data and command are transmitted.

In addition to the main data and command, a status signal that represents the operating state of the IC card 26 is supplied from the IC card 26 to the main unit 21 through the DT line 33. The status signal is supplied from the IC card 26 while the main data and command are not being transmitted through the DT line 33 (namely, while the control signal is not being supplied, for example while the signal level is low). The status signal includes a busy signal that represents that the IC card 26 is performing a process. When the IC card 26 is performing a writing process and the main unit 21 is prohibited from accessing the IC card 26, the busy signal is supplied from the IC card 26 to the main unit 21. The status signal also includes an interrupt signal that represents that the IC card 26 requests the main unit 21 to perform a particular operation. When the IC card 26 requests the main unit 21 to execute an interrupt instruction, the IC card 26 supplies the interrupt signal to the main unit 21. It should be noted that the busy signal and interrupt signal are just examples. In other words, as long as the status signal represents an operating state of the IC card 26, the status signal may be any signal.

Figure 6:
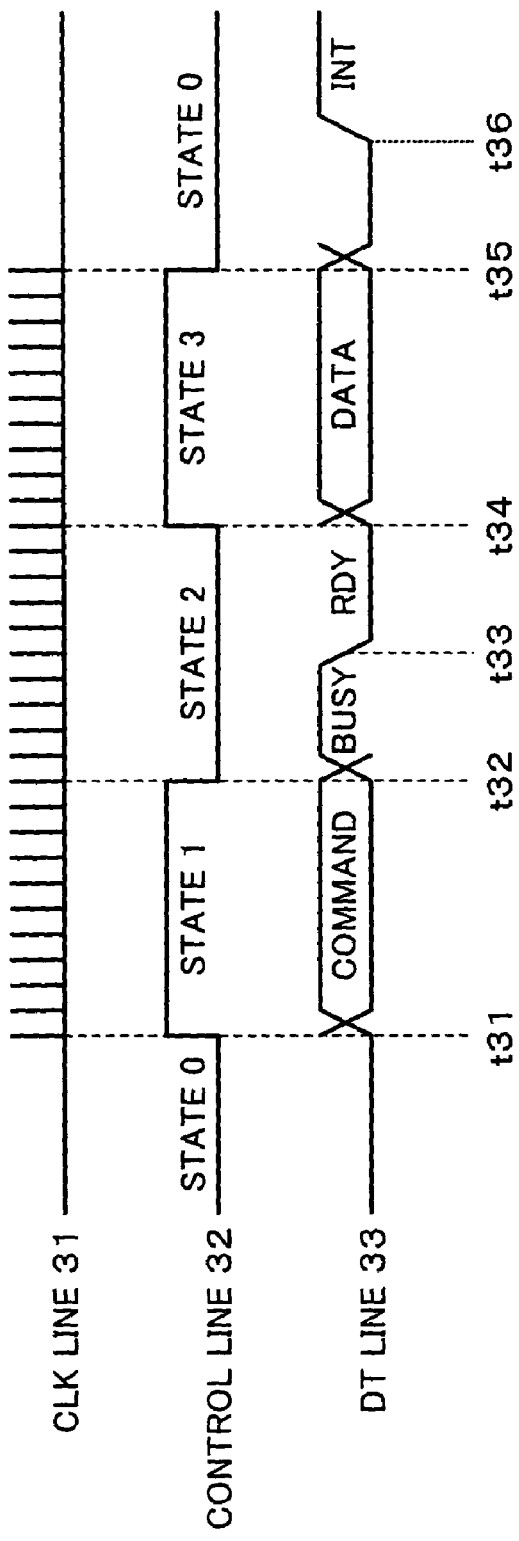
FIG. 6 is a timing chart for explaining the IC card system.

FIG. 6 shows a timing at which data is read from the IC card 26. While no data is being transmitted and received between the main unit 21 and the IC card 26, the signal level of the control line 32 is low. This state is referred to as state 0 (initial state). At timing t31, the main unit 21 changes the signal level of the control line 32 to high. As a result, the state 0 is changed to state 1.

When the signal level of the control line 32 becomes high, the IC card 26 detects that the state 0 has been changed to the state 1. In the state 1, a read command is transmitted from the main unit 21 to the IC card 26 through the DT line 33. The IC card 26 receives the read command. The read command is a protocol command referred to as serial interface TPC. As will be described later, the protocol command designates the content to be communicated and the data length of data that is followed thereby.

After the command has been transmitted at timing t32, the signal level of the control line 32 is changed from high to low. As a result, the state 1 is changed to state 2. In the state 2, the IC card 26 performs a process designated by a read command (in reality, a process for reading data from the memory 27 corresponding to an address designated by the read command). While the IC card 26 is performing the process, a busy signal (in high level) is transmitted to the main unit 21 through the DT line 33.

After data has been read from the memory 27 at timing t33, the output of the busy signal is stopped. The output of a ready signal (in low level) that represents that the IC card 26 is ready for transmitting data to the main unit 21 is started.

When the main unit 21 receives the ready signal from the IC card 26, the main unit 21 knows that the IC card 26 is ready for the process corresponding to the read command. At timing t34, the main unit 21 changes the signal level of the control line 32 to high. In other words, the state 2 is changed to the state 3.

In the state 3, the IC card 26 outputs the data that has been read to the register 28 in the state 2 to the main unit 21 through the DT line 33. After the data that had been read has been transmitted at timing t35, the main unit 21 stops transmitting the clock signal. In addition, the main unit 21 changes the signal level of the status line from high to low. As a result, the state 3 is changed to the initial state (state 0).

When some interrupt process is required due to a change of the internal state of the IC card 26, at timing t36, the IC card 26 supplies the interrupt signal that represents an interrupt to the data processing apparatus through the DT line 33 in the state 0. The main unit 21 is designated to know that when a signal is supplied from the IC card 26 through the DT line 33 in the state 0, the signal is an interrupt signal. When the main unit 21 receives the interrupt signal, the main unit 21 performs a predetermined process corresponding to the interrupt signal.

Figure 7:
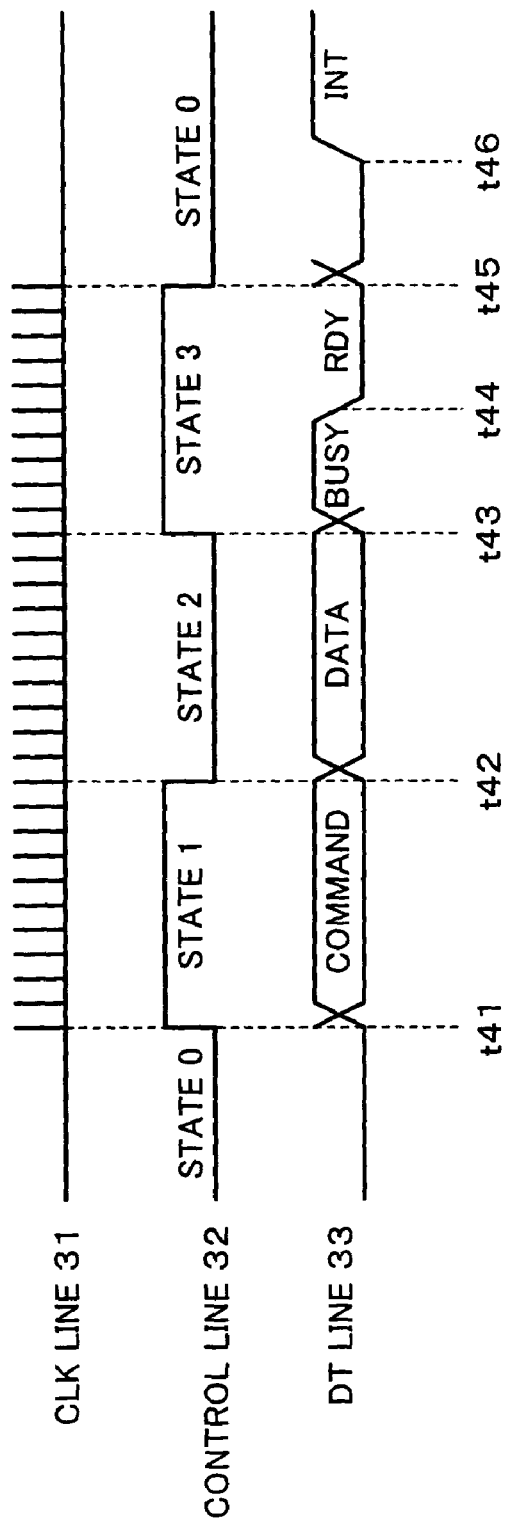
FIG. 7 is a timing chart for explaining the IC card system.

FIG. 7 is a timing chart showing the case that data is written to the memory 27 of the IC card 26. In the initial state (state 0), no signal is transmitted through the CLK line 31. At timing t41, the main unit 21 changes the signal level of the control line 32 from low to high. As a result, the initial state is changed to the state 1. In the state 1, a write command is transmitted through the DT line 33. In the state 1, the IC card 26 is ready for obtaining a command. At timing t41, a command is transmitted to the IC card 26 through the DT line 33. The IC card 26 obtains the write command.

After the write command has been transmitted at timing t42, the main unit 21 changes the signal level of the control line 32 from high to low. As a result, the state 1 is changed to the state 2. In the state 2, the main unit 21 transmits write data to the IC card 26 through the DT line 33. In the IC card 26, the received write data is stored in the register 28.

After the write data has been transmitted at step t43, the main unit 21 changes the signal level of the control line 32 from low to high. As a result, the state 2 is changed to the state 3. In the state 3, the IC card 26 performs a process for writing the write data to the memory 27. In the state 3, the IC card 26 transmits a busy signal (in high level) to the main unit 21 through the DT line 33. Since the main unit 21 has transmitted the write command and the current state is the state 3, the main-unit 21 knows that the signal transmitted from the IC card 26 is a status signal.

After the IC card 26 has performed the writing process for the write data at timing t44, the IC card 26 stops outputting the busy signal and transmits the ready signal (in low level) to the main unit 21. When the main unit 21 receives the ready signal, the main unit 21 determines that the IC card 26 has completed the writing process corresponding to the write command and stops transmitting the clock signal to the IC card 26. At timing t45, the main unit 21 changes the signal level of the control line 32 from high to low. As a result, the state 3 is returned to the state 0 (initial state).

When the main unit 21 has received a signal in high level from the IC card 26 through the DT line 33 in the state 0, the main unit 21 knows that this signal is an interrupt signal. The main unit 21 performs a predetermined process corresponding to the received interrupt signal. For example, when the IC card 26 is removed from the main unit 21, the IC card 26 generates the interrupt signal.

Besides the forgoing reading operation and writing operation, in the state 1, a command is transmitted; in the state 2 preceded thereby, data corresponding to the command is transmitted.

Figure 8:
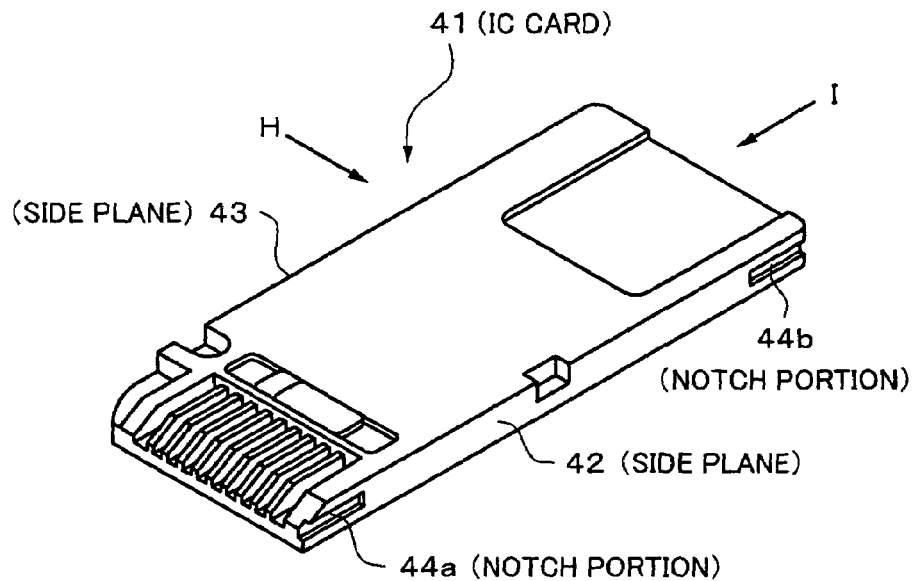
FIG. 8 is a perspective view showing an example of the shape of the IC card according to the present invention.
Figure 9:
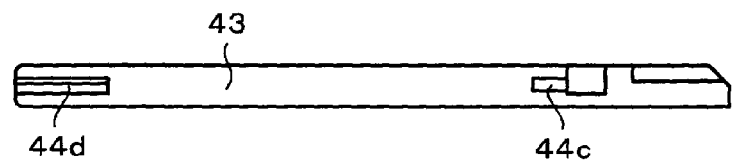
FIG. 9 is a schematic diagram viewed from an H direction of the IC card.
Figure 10:
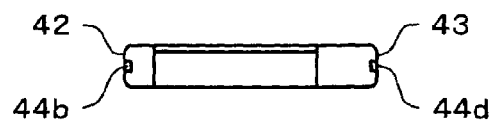
FIG. 10 is a schematic diagram viewed from an I direction of the IC card shown in FIG. 8.

FIG. 8 shows an appearance of the IC card 41. FIG. 9 shows the IC card 41 viewed from an H direction of FIG. 8. FIG. 10 shows the IC card 41 viewed from an I direction of FIG. 8. The IC card 41 has a nearly rectangular plane shape. The IC card 41 has a first side plane 42 and a second side plane 43. At both edge portions of the first side plane 42, mounting notch portions 44a and 44b are formed, respectively. As shown in FIG. 9, at both edge portions of the second side plane 43, mounting notch portions 44c and 44d are formed, respectively.

Figure 11:
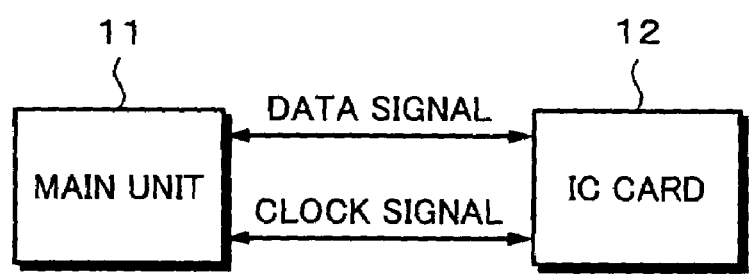
FIG. 11 is a block diagram showing an outlined structure of the IC card system according to the present invention.

The present invention applied for the forgoing removable IC card and main unit. For example, the present invention is applied for a data communication performed between the host side serial interface circuit 24 shown in FIG. 5 and the card side serial interface circuit 29. FIG. 11 shows an IC card system according to the present invention. To perform a data communication between a main unit 11 and an IC card 12, a clock signal and a data signal that is input and output in synchronization therewith are used. Not only the data signal, but the clock signal is bi-directionally communicated.

Figure 12:
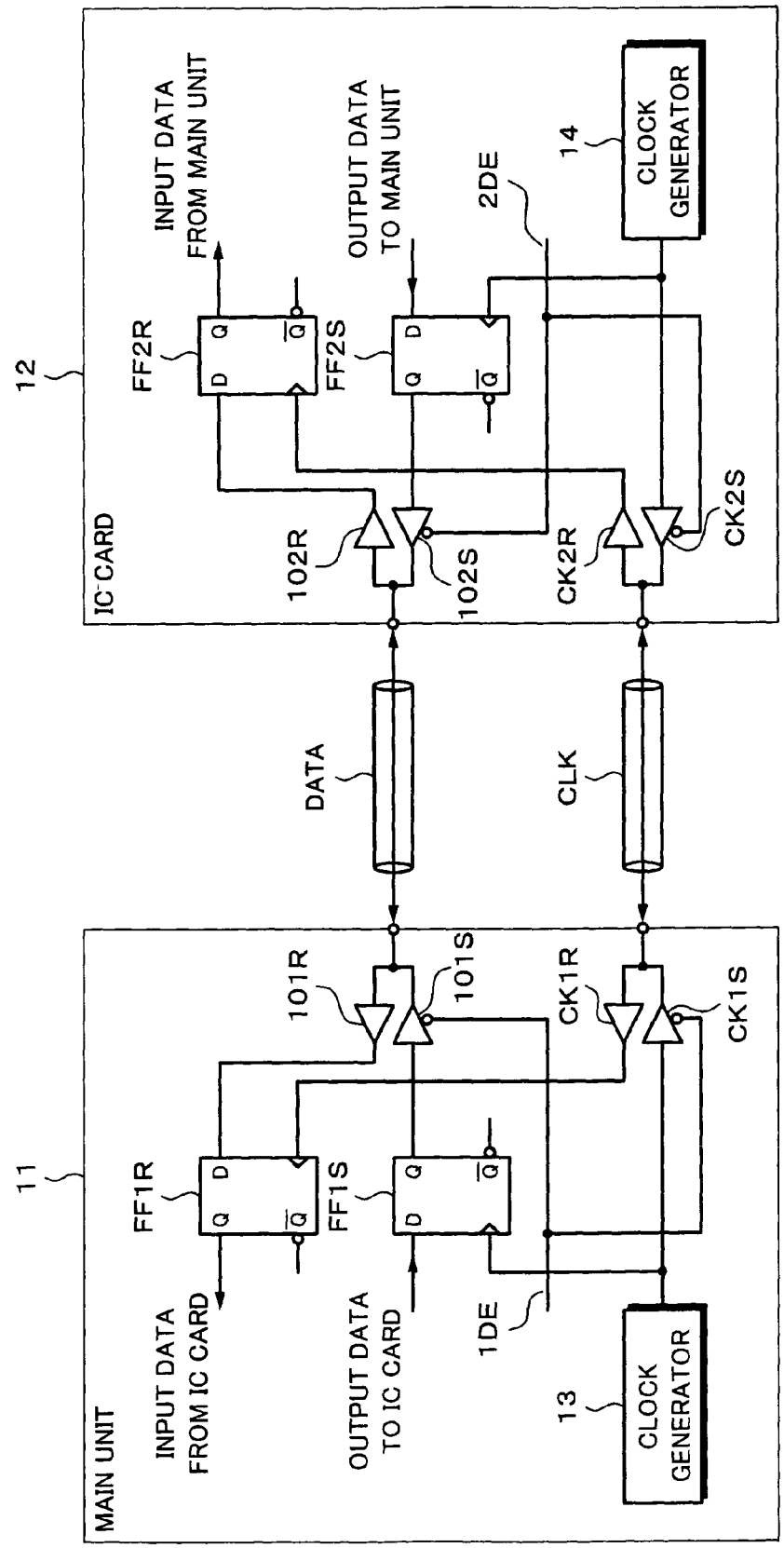
FIG. 12 is a block diagram showing an embodiment of the present invention.

FIG. 12 shows an embodiment of the present invention. In FIG. 12, reference characters FF1R, FF1S, FF2R, and FF2S represent flip-flops. Each of the flip-flops FF1R, FF1S, FF2R, and FF2S has a data input D and a data output Q. Reference characters 101R, 102R, CK1R, and CK2R represent input buffers. Reference characters 101S, 102S, CK1S, and CK2S represent output buffers. The output buffers 101S, 102S, CK1S, and CK2S are composed of tri-state buffers. The main unit 11 has a clock generator 13. The IC card 12 has a clock generator 14. Reference characters 1DE and 2DE represent control signals. Reference characters DATA and CLK represent transmission paths disposed between the main unit 11 and the IC card 12.

First of all, the case that data is transmitted from the main unit 11 to the IC card 12 will be described. The control signal 1DE causes the tri-state buffers 101S and CK1S to be set to an output enable state. The control signal 2DE causes the tri-state buffers 102S and CK2S to be set to an output high impedance state. As a result, data is transmitted from the flip-flop FF1S to the flip-flop FF2R. A clock signal is generated by the clock generator 13 of the main unit 11. The clock signal is input to the clock input of the flip-flop FF2R through a path of (output buffer CK1S->transmission path CLK->input buffer CK2R).

A data signal is output from the flip-flop FF1S in synchronization with a leading edge of the clock signal that is input from the clock generator 13 to the clock input of the flip-flop FF1S. The data signal is input to the data input of the flip-flop FF2R through a path of (output buffer 101S->transmission path DATA->input buffer 102R). The data signal is captured in synchronization with a leading edge of the clock input of the flip-flop FF2R.

Next, the case that data is transmitted from the IC card 12 to the main unit 11 will be described. The control signal 1DE causes the tri-state buffers 101S and CK1S to be set to an output high impedance state. The control signal 2DE causes the tri-state buffers 102S and CK2S to be set to an output enable state. As a result, data is transmitted from the flip-flop FF2S to the flip-flop FF1R. A clock signal is generated by the clock generator 14 of the IC card 12. The clock signal is input to the clock input of the flip-flop FF1R through a path of (output buffer CK2S->transmission path CLK->input buffer CK1R).

A data signal is output from the flip-flop FF2S in synchronization with a leading edge of the clock signal that is input from the clock generator 14 to the clock input of the flip-flop FF2S. The data signal is input to the data input of the flip-flop FF1R through a path of (output buffer 102S->transmission path DATA->input buffer 101R) and captured in synchronization with a leading edge of the clock input of the flip-flop FF1R.

Figure 13:
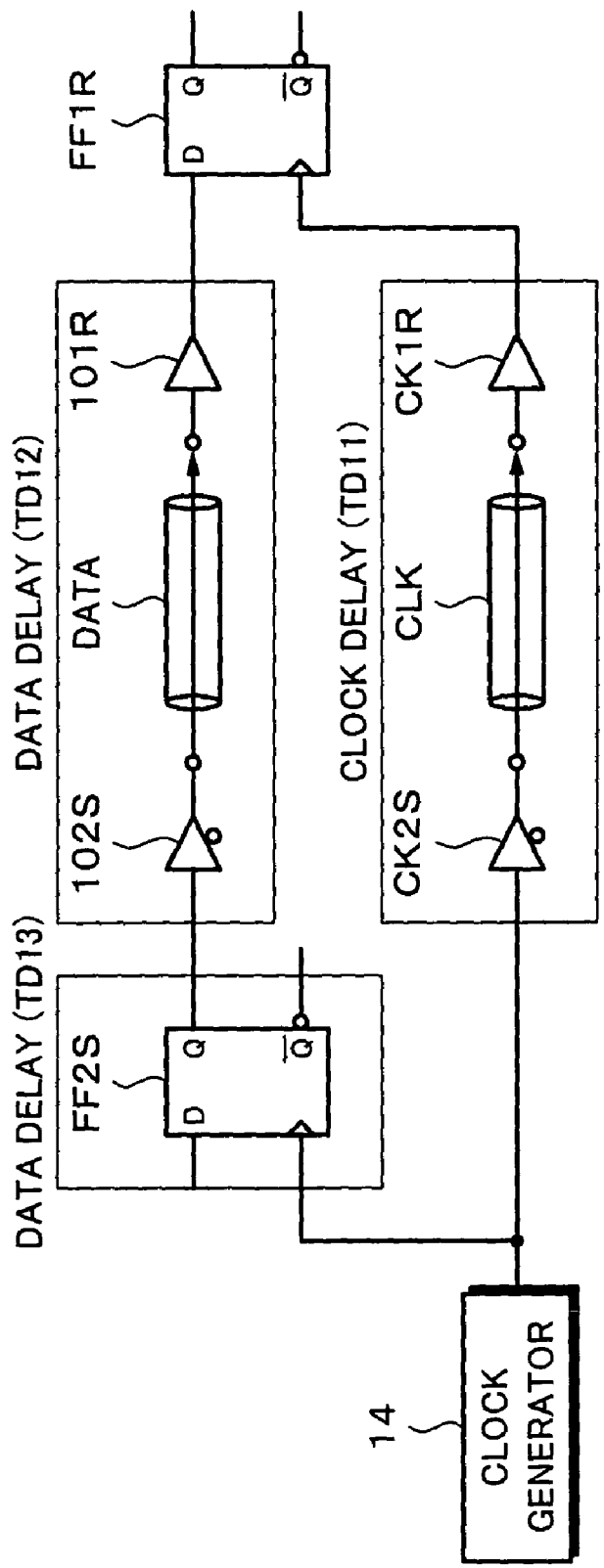
FIG. 13 is a block diagram for explaining a data communication performed from the IC card to the main unit according to the embodiment of the present invention.
Figure 14:
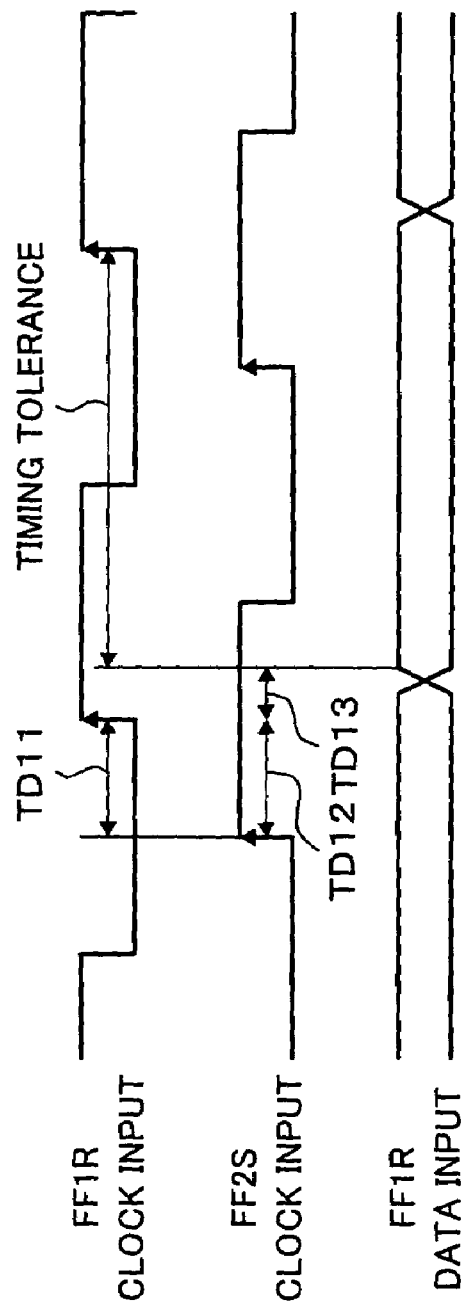
FIG. 14 is a timing chart for explaining the data communication shown in FIG. 13.

FIG. 13 is a schematic diagram showing the structure of the system that transmits data from the IC card 12 to the main unit 11. FIG. 14 is a timing chart of the system shown in FIG. 13. Next, with reference to FIGS. 13 and 14, the data transmission of the system will be described.

As shown in FIG. 13, when the data communication is performed from the IC card 12 to the main unit 11, the data signal is transmitted from the flip-flop FF2S to the flip-flop FF1R. The clock signal of the flip-flop FF1R has a delay that is the sum of a delay due to the output buffer CK2S, a delay due to the transmission path CLK, and a delay due to the input buffer CK1R against the clock signal of the flip-flop FF2S. The sum of the delays is denoted by clock delay TD11.

In addition, the delay after the timing of a leading edge of the clock input of the flip-flop FF1R until the arrival of the clock signal to the data input of the flip-flop FF2S is the sum of a delay due to the flip-flop FF2S, a delay due to the output buffer 102S, a delay due to the transmission path DATA, and a delay due to the input buffer 101R. The delay due to the flip-flop FF2S is denoted by data delay TD13. The sum of the delay due to the output buffer 102S, the delay due to the transmission path DATA, and the delay due to the input buffer 101R is denoted by data delay TD12.

When the four output buffers 102S, CK2S, 101R, and CK1R are of the same type, a connector for the transmission path DATA is the same as a connector for the transmission path CLK, and the length of a cable used for the transmission path DATA is the same as the length of a cable used for the transmission path CLK, the clock delay TD11 becomes nearly the same as the data delay TD12. As shown in FIG. 14, only the data delay TD13 causes the timing tolerance to decease. Thus, as shown in FIG. 14, the timing tolerance can be prevented from decreasing. As a result, the system according to the embodiment can communicate at higher rate than the conventional system.

Figure 15:
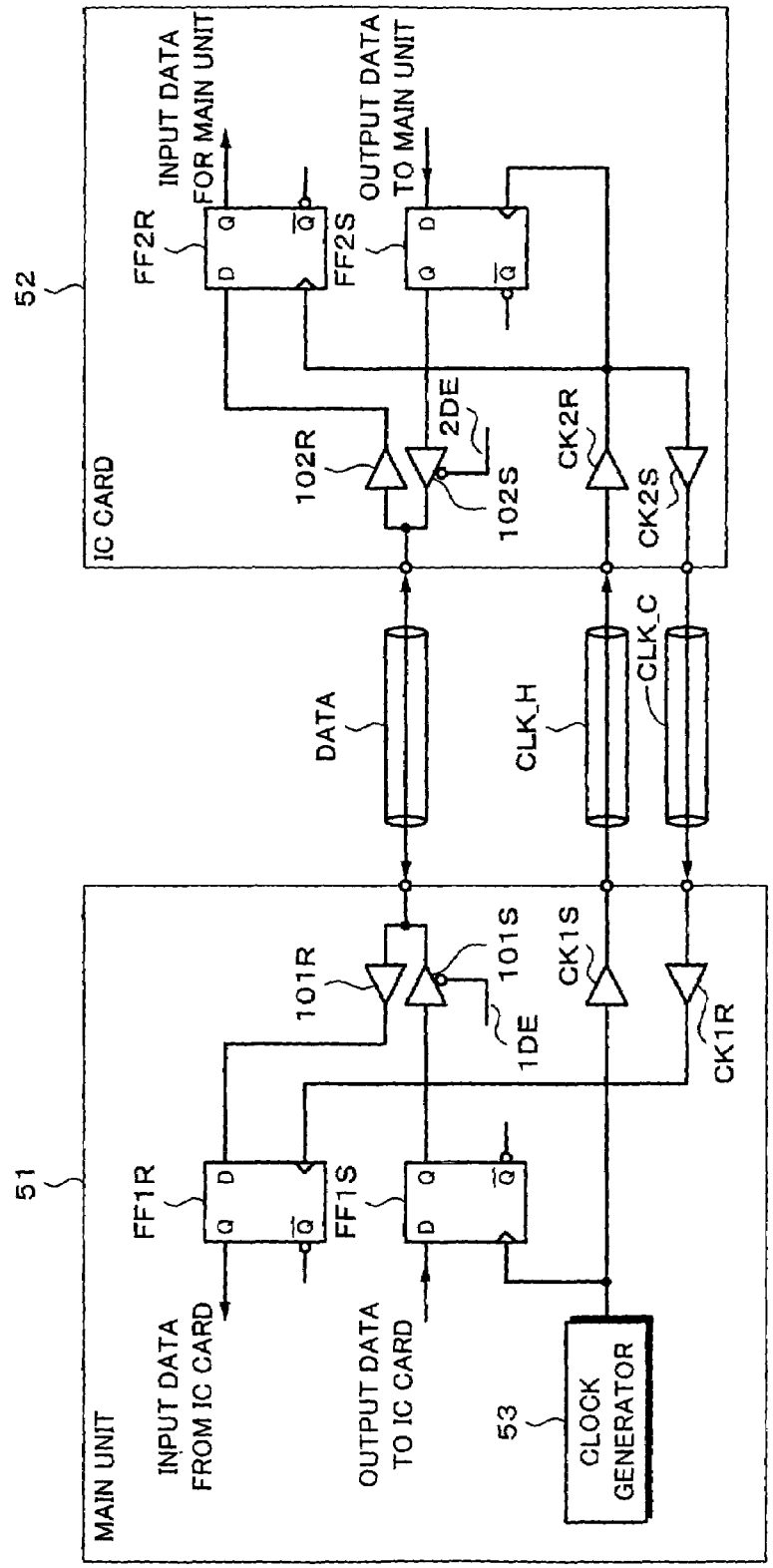
FIG. 15 is a block diagram of another embodiment of the present invention.

FIG. 15 shows a system composed of a main unit 51 and an IC card 52 according to another embodiment of the present invention. The embodiment shown in FIG. 15 is different from the embodiment shown in FIG. 12 in that there are two transmission paths CLK_H and CLK_C for a clock signal. According to the embodiment shown in FIG. 15, although two transmission paths for a clock signal are used, the clock signal can be bi-directionally communicated without need to dispose a clock generator in the IC card 52.

In FIG. 15, reference characters FF1R, FF1S, FF2R, and FF2S represent flip-flops. Each of the flip-flops FF1R, FF1S, FF2R, and FF2S has a data input D and a data output Q. Reference characters 101R, 102R, CK1R, and CK2R represent input buffers. Reference characters 101S, 102S, CK1S, and CK2S represent output buffers. The output buffers 101S and 102S are composed of tri-state buffers. Reference characters 1DE and 2DE represent control signals. The main unit 51 has a clock generator 53. A clock signal is transmitted from the main unit 51 to the IC card 52 through the transmission path CLK_H. In addition, the clock signal is transmitted from the IC card 52 to the main unit 51 through the transmission path CLK_C. A data signal is bi-directionally transmitted between the main unit 51 and the IC card 52 through a transmission path DATA.

First of all, the case that a data communication is performed from the main unit 51 to the IC card 52 will be described. The control signal 1DE causes the tri-state buffer 101S to be set to an output enable state. The control signal 2DE causes the tri-state buffer 102S to be set to an output high impedance state. As a result, data is transmitted from the flip-flop FF1S to the flip-flop FF2R. The clock signal is generated by the clock generator 53 of the main unit 51. The clock signal is input to the clock input of the flip-flop FF2R through a path of (output buffer CK1S->transmission path CLK_H->input buffer CK2R).

The data signal is output from the flip-flop FF1S in synchronization with a leading edge of the clock signal that is input from the clock generator 53 to the clock input of the flip-flop FF1S. The data signal is input to the data input of the flip-flop FF2R through a path of (output buffer 101S->transmission path DATA->input buffer 102R). The data signal is captured in synchronization with a leading edge of the clock input of the flip-flop FF2R.

Next, the case that a data communication is performed from the IC card 52 to the main unit 51 will be described. The control signal 1DE causes the tri-state buffer 101S to be set to an output high impedance state. The control signal 2DE causes the tri-state buffer 102S to be set to an output enable state. As a result, data is transmitted from the flip-flop FF2S to the flip-flop FF1R. The clock signal is generated by the clock generator 53 of the main unit 51. The clock signal is input to the clock input of the flip-flop FF1R through a path of (output buffer CK1S->transmission path CLK_H->input buffer CK2R->output buffer CK2S->transmission path CLK_C->input buffer CK1R).

The data signal is output from the flip-flop FF2S in synchronization with a leading edge of the clock signal that is input from the clock generator 53 to the clock input of the flip-flop FF2S through a path of (output buffer CK1S->transmission path CLK_H->input buffer CK2R). The data signal is input to the data input of the flip-flop FF1R through a path of (output buffer 102S->transmission path DATA->input buffer 101R). The data signal is captured in synchronization with a leading edge of the clock input of the flip-flop FF1R.

Figure 16:
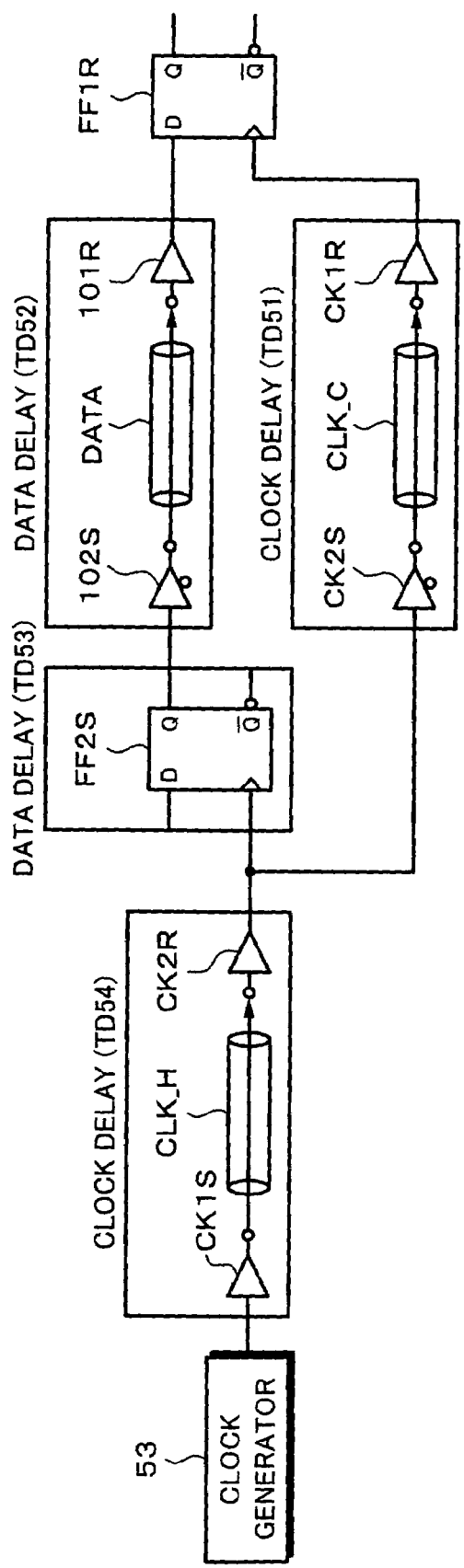
FIG. 16 is a block diagram for explaining a data communication performed from an IC card to a main unit according to the other embodiment of the present invention.

FIG. 16 is a schematic diagram showing the structure of the system that performs a data communication from the IC card 52 to the main unit 51. Since the timing chart of the system shown in FIG. 16 is the same as that shown in FIG. 14, the timing chart is omitted.

As shown in FIG. 16, when a data communication is performed from the IC card 52 to the main unit 51, the data signal is transmitted from the flip-flop FF2S to the flip-flop FF1R. The clock signal that is input from the clock generator 53 to the clock input of the flip-flop FF2S has a delay that is the sum of a delay due to the output buffer CK1S, a delay due to the transmission path CLK_H, and a delay due to the input buffer CK2R. The sum of the delays is denoted by clock delay TD54. The clock signal that is input from the input buffer CK2R to the clock input of the flip-flop FF1R has a delay that is the sum of a delay due to the output buffer CK2S, a delay due to the transmission path CLK_C, and a delay due to the input buffer CK1R. The sum of the delays is denoted by clock delay TD51. In addition, a delay after a leading edge of the clock input of the flip-flop FF2S until the arrival of the clock signal to the data input of the flip-flop FF2S is the sum of a delay due to the flip-flop FF2S, a delay due to the output buffer 102S, a delay due to the transmission path DATA, and a delay due to the input buffer 101R. The delay due to the flip-flop FF2S is denoted by data delay TD53. The sum of the delay due to the output buffer 102S, the delay due to the transmission data DATA, and the delay due to the input buffer 101R is denoted by data delay TD52.

In this case, the delay of the clock signal from the clock generator to the clock input of the flip-flop FF2S is TD54. On the other hand, the delay of the clock signal from the clock generator 53 to the clock input of the flip-flop FF1R is the sum of the delay TD54 and the delay TD51. As a result, the clock signal of the flip-flop FF2S has the delay TD51 against the clock signal of the flip-flop FF2S. Since only the data delay TD53 causes the timing tolerance to decrease, the system according to the embodiment shown in FIG. 16 can perform a communication at higher speed than the conventional IC card.

The present invention is not limited to the forgoing embodiments. In other words, various modifications and ramifications are possible without departing from the scope of the present invention. For example, the present invention can be applied to a parallel communication, not limited to a serial communication.

According to the present invention, in addition to-a data signal that is input and output to and from an IC card in synchronization with a clock signal, a clock signal is output from an IC card. In addition, the present invention is structured so that there is no difference between the delay time of the clock signal and the delay time of the data signal. Thus, a communication of data that is output from the IC card can be performed at higher speed than the conventional IC card. Thus, a large amount of data can be transmitted in a short time.

What is claimed is:

1. A system, comprising:
a main unit;
an IC card; and
an interface connectable between said main unit and said IC card, including:
a data transmission path, and
a clock signal transmission path;
said IC card being operable to receive a clock signal transmitted from the main unit over said clock signal transmission path and to return the clock signal to said main unit over said clock signal transmission path;
said IC card including:
a data transmission unit having a clock input operable to receive the clock signal that is received by said IC card and having a data output operable to transmit, over said data transmission path for delivery to said main unit, a data signal having a first timing delay with respect to a timing of the clock signal received at said clock input of said data transmission unit;
said main unit including:
a data receiving unit having a clock input operable to receive the returned clock signal, the clock signal received at said clock input of said data receiving unit having a second timing delay with respect to a timing of the clock signal being returned at said IC card, and having a data input operable to receive the data signal transmitted by said data transmission unit, the data signal when being received at said data input of said data receiving unit having a third timing delay with respect to the timing of the data signal when being transmitted at said data output of said data transmission unit;
said main unit, said IC card, and said interface being configured such that the second delay is substantially equal to the third delay so that only the first delay affects a timing tolerance between the timing of the clock signal received at said clock input of said data receiving unit and the timing of the data signal received at said data input of said data receiving unit.

2. The system as set forth in claim 1, wherein said clock transmission path includes a common path over which the clock signal is transferred from said main unit to said IC card and from said IC card to said main unit.

3. The system as set forth in claim 1, wherein said clock signal transmission path includes a first path over which the clock signal is transferred from said main unit to said IC card and a second path over which the clock signal is transferred from said IC card to said main unit.

4. The system as set forth in claim 3, wherein said main unit is operable to transmit a further data signal over said data transmission path to said IC card in synchronization with the clock signal generated by said clock generating unit.

5. The system as set forth in claim 3, wherein the clock signal received at said clock input of said data receiving unit has a fourth timing delay with respect, to a timing of the clock signal when being generated at said clock generating unit.

6. The system as set forth in claim 1, wherein said main unit includes a clock generating, unit operable to generate the clock signal.

7. The system as set forth in claim 1, wherein said IC card includes a first buffer which outputs the data signal to said data transmission path a second buffer which outputs the clock signal to said clock transmission path, said first buffer and said second buffer being substantially the same kind, said main unit includes a third buffer which inputs the data signal received from said data transmission path and a fourth buffer which inputs the clock signal received from said clock transmission path, said third buffer and said fourth buffer being substantially the same kind, and a length of said data transmission path and a length of said clock transmission path are substantially the same.

8. The system as set forth in claim 1, wherein said IC card includes a flash memory, said main unit is operable to transmit a further data signal over said data transmission path to said IC card the further data signal being recorded in said flash memory.

9. The system as set forth in claim 1, wherein said main unit is operable to transmit a further data signal over said data transmission path to said IC card in synchronization with the clock signal transmitted by said main unit.

* * * * *

UNITED STATES PATENT AND TRADEMARK OFFICE
CERTIFICATE OF CORRECTION

PATENT NO. : 7,017,810 B2  
APPLICATION NO. : 10/182953  
DATED : March 28, 2006  
INVENTOR(S) : Hideaki Bando Page 1 of 1

It is certified that error appears in the above-identified patent and that said Letters Patent is hereby corrected as shown below:

Column 10, line 58, "to-a" should read --to a--.  
Column 12, line 14, after "respect", delete ",".  
Column 12, line 18, after "generating", delete ",".  
Column 12, line 23, "path a", should read --path to a--.  
Column 12, line 37, "card", should read --card,--.

Signed and Sealed this

First Day of August, 2006

JON W. DUDAS  
*Director of the United States Patent and Trademark Office*